Figure 1:
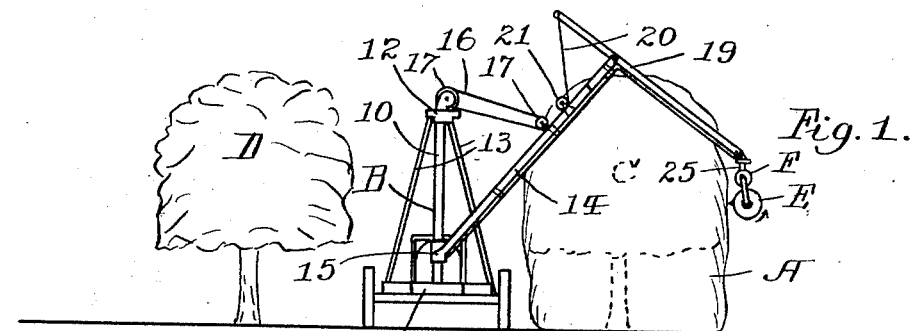
Figure 2:
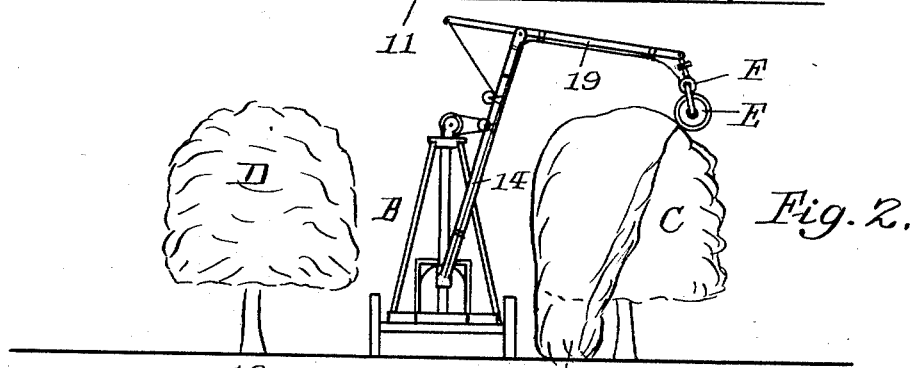
Figure 3:
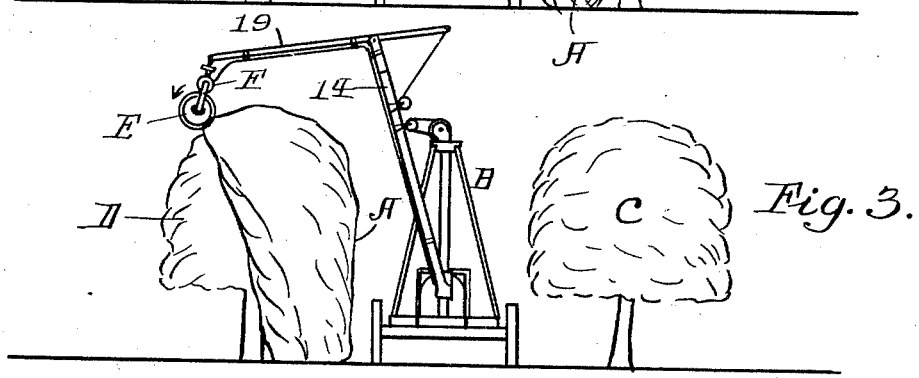
Figure 4:
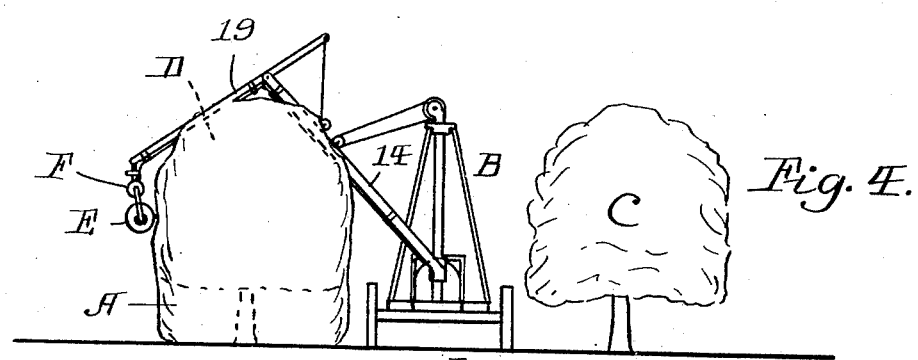

May 6, 1930.                    C. VAUGHN                    1,757,276
                        METHOD OF FUMIGATING TREES
                          Filed April 27, 1927          2 Sheets-Sheet 1

Inventor:
Clyde Vaughn,
by Bradbury & Caswell
Attorneys.

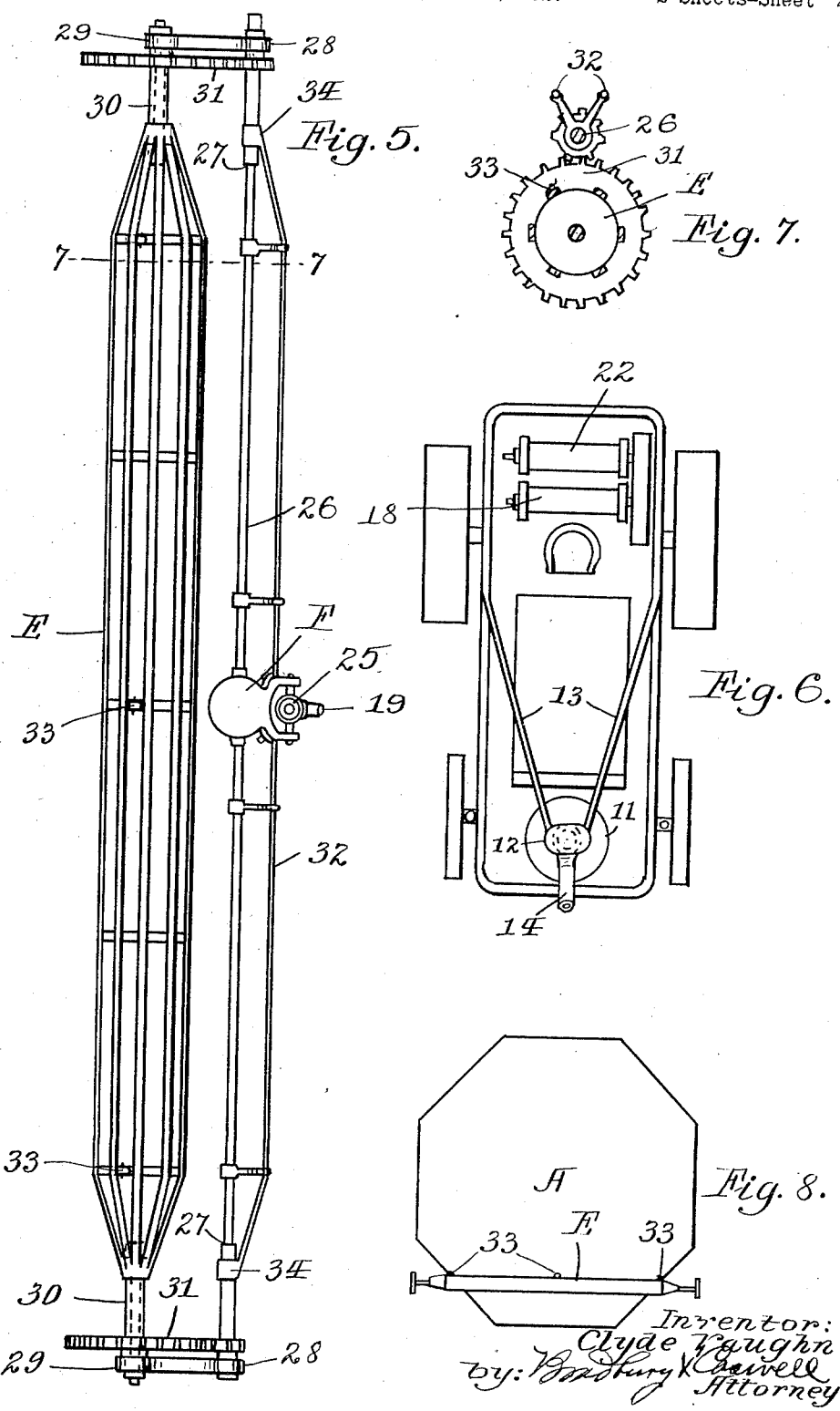

Patented May 6, 1930

1,757,276

UNITED STATES PATENT OFFICE

CLYDE VAUGHN, OF PASADENA, CALIFORNIA

METHOD OF FUMIGATING TREES

Application filed April 27, 1927. Serial No. 186,962.

In fumigating fruit and other trees and shrubs to destroy insects and other pests that infect them it has been customary to cover the tree with a sheet of canvas or other material which folds around and over the tree and forms a tent within which the fumigating gas is injected or the materials used in forming the fumigating gas are placed, said gas usually being cyanide of potassium. This treatment is usually applied at night and the pieces of canvas or tents have heretofore been moved by means of poles operated by hand. Where the trees are large the tents are usually heavy, the poles are usually long and heavy, the whole apparatus is awkward and difficult to manage, and it requires considerable time to place the tent over a tree or shrub and to remove it therefrom. A slight wind blowing makes this operation particularly difficult and frequently branches of the trees, blossoms and fruit are broken, scratched and scarred, thus doing much damage. I have found in practice this damage has been done chiefly by pulling and dragging the tents over the trees or shrubs and by the canvas rubbing and abrading the fruit. Dragging the tent on the ground also collects dampness and sand which causes damage to green fruit. In prior devices and methods the tents as stated are dragged from one tree to another whereas with my improvement an inverting or rolling action is employed to overcome this objection. This invention also enables the transportation of the tents from grove to grove while in rolls, thus saving time, labor and expense, and wear and tear on tent equipment.

The objects of my invention are to avoid the above noted objections and to enable the tent to be raised at any time, to enable the handling of the canvas cover with fewer operations and with less time and labor and in a more expeditious manner than heretofore, to prevent at all times the breaking of branches, and rubbing, scratching and scarring of blossoms and fruit, and to save canvas by reducing wear and tear.

I accomplish these objects by the means and in the manner described herein and as illustrated in the accompanying drawings.

In the accompanying drawings forming part of these specifications, Figs. 1 to 4 inclusive are diagrammatic views illustrating the operation of my improvement, Fig. 5 is a side elevation of the roller on the end of the supplemental boom of the tractor crane; Fig. 6 is a diagrammatic plan of the tractor crane; Fig. 7 is a section taken on the line 7—7 of Fig. 5, and Fig. 8 is a plan of the tent showing the roller attached thereto in readiness to be wound thereon.

For the purpose of illustrating the method of practicing my invention, I have shown one form of apparatus by the use of which the tent is transferred from tree to tree and I have also shown the application of the invention to citrus fruit trees. It will be understood however that the invention can be applied by other means and to trees and other articles to be fumigated, within the spirit of the invention and of the claim following.

The apparatus shown is for the purpose of transferring the tent A from tree to tree, said tent being octangular in shape and made of canvas or other suitable material. Said apparatus consists of a tractor crane B, which may be moved down a lane between rows of trees to be fumigated, one of the trees C being in one row and D in an adjacent row. The tractor crane may be of any suitable construction and preferably has the mast 10 stepped in the power driven turn table 11 on the tractor. The upper end of the mast is journaled in the bearing 12 which is supported by the stays 13 on the frame of the tractor. A telescopic boom 14 is hinged at its lower end 15 on the mast and is raised and lowered by the cable 16 running over sheaves 17 and wound and unwound on the power driven winch 18 (see Fig. 6). On the outer end of the boom 14 is hinged a tiltable supplemental boom 19, the short power end of which is tilted up and down to raise and lower the long work end by means of the cable 20, which passes down over the sheaves 21 to the power driven winch 22. The means for operating the winches and turn table may be by connecting with the transmission of the tractor in any well known manner not shown, the means for controlling the booms being manipulated by the driver seated upon the tractor and not forming the subject matter of the invention sought to be included in this application. On the work end of the supplemental boom is hung by the universal joint 25, a combined tent roller and spreader E, which is adapted to be fastened to the tent as illustrated in Fig. 8, for the purpose of manipulating the tent over the trees to be fumigated. The universal joint is constructed into the housing of the motor F, from which extends a drive shaft 26, said drive shaft being extensible by the telescopic joints 27 upon its ends and carrying upon its extremities a pair of hangers 28, which in turn form journals 29, in which the telescopic trunnions 30 turn and carry the spider roller E. Reduction gearing 31, connected with the shaft 26 and trunnions 30, serves to transmit power derived from motor F, through shaft 26 and trunnions 30 to the roller E. A pair of stays 32, anchored to the housing of motor F and collars 34, serve to relieve the lateral strain from the shaft 26 and help support the roller E. The motor may be electric, pneumatic or any other form desired, the mode of operation being forwardly or backwardly and controlled through suitable connections by the operator seated upon the tractor.

In the practice of my invention the tractor crane is driven from station to station down the lane or alley between rows of trees to be fumigated and at each stop a tent is removed from a tree in one row and transferred to a corresponding tree in an adjacent row.

Assuming that tree C has been covered by tent A as shown in Fig. 1, after tree C has been fumigated and that it is desired to transfer said tent to cover tree D in the adjoining row, the roller E is placed alongside the far side of tent A a few feet or any desired distance above the ground. The tent is then secured by spring clips 33 to the outside of the tent, the position assumed relative to the tent being as shown in Fig. 8. The motor F is then operated to turn the roller in the direction of the arrow shown in Fig. 1 and the roller raised by the crane into the position shown in Fig. 2. The roller is then additionally raised by the supplemental boom and the crane swung to lift the tent bodily off of the near side of tree C, without dragging against the branches and lowered again into the position draping the near side of tree D, shown in Fig. 3, the action transpiring being to invert the tent from tree C over tree D without dragging over the branches. The next step is to reverse the action of the motor F and unroll the tent on the far side of tree D, while the supplemental boom is being lowered into the position shown in Fig. 4, whereupon tree D is completely covered and ready to be fumigated. The roller is next detached from the tent and the tractor moved on to the next station. Throughout the entire operation the tent is manipulated by an inverting rolling action which reduces all hazard of damaging fruit, blossoms and branches.

When starting to drape the trees of a first row to be fumigated, the tent is spread flat upon the ground and the roller fastened thereto as shown in Fig. 8, and the lower portion of one side wound thereon. The roller is then lifted by the crane and moved over to drape the near side of the tree and the roller reversed to complete the draping of the far side of the tree and detached.

In accordance with the patent statutes, I have described the principles of operation of my invention, together with the apparatus which I now consider to represent the best embodiment thereof, but I desire to have it understood that the construction shown is only illustrative and that the invention can be carried into use by other means and applied to uses other than those above set forth within the scope of the following claim.

I claim:

The method of transferring a flexible fumigating cover from one tree or plant to another, consisting in manipulating the cover at the far side of the covered tree or plant by lifting a portion of the cover at said side to take up said portion, then shifting the unlifted portion of the cover to partially envelope the other tree or plant, and finally releasing the lifted portion to complete the envelopment of said other tree or plant.

In testimony whereof, I have signed my name to this specification.

CLYDE VAUGHN.